United States Patent Office 3,239,036
Patented Mar. 8, 1966

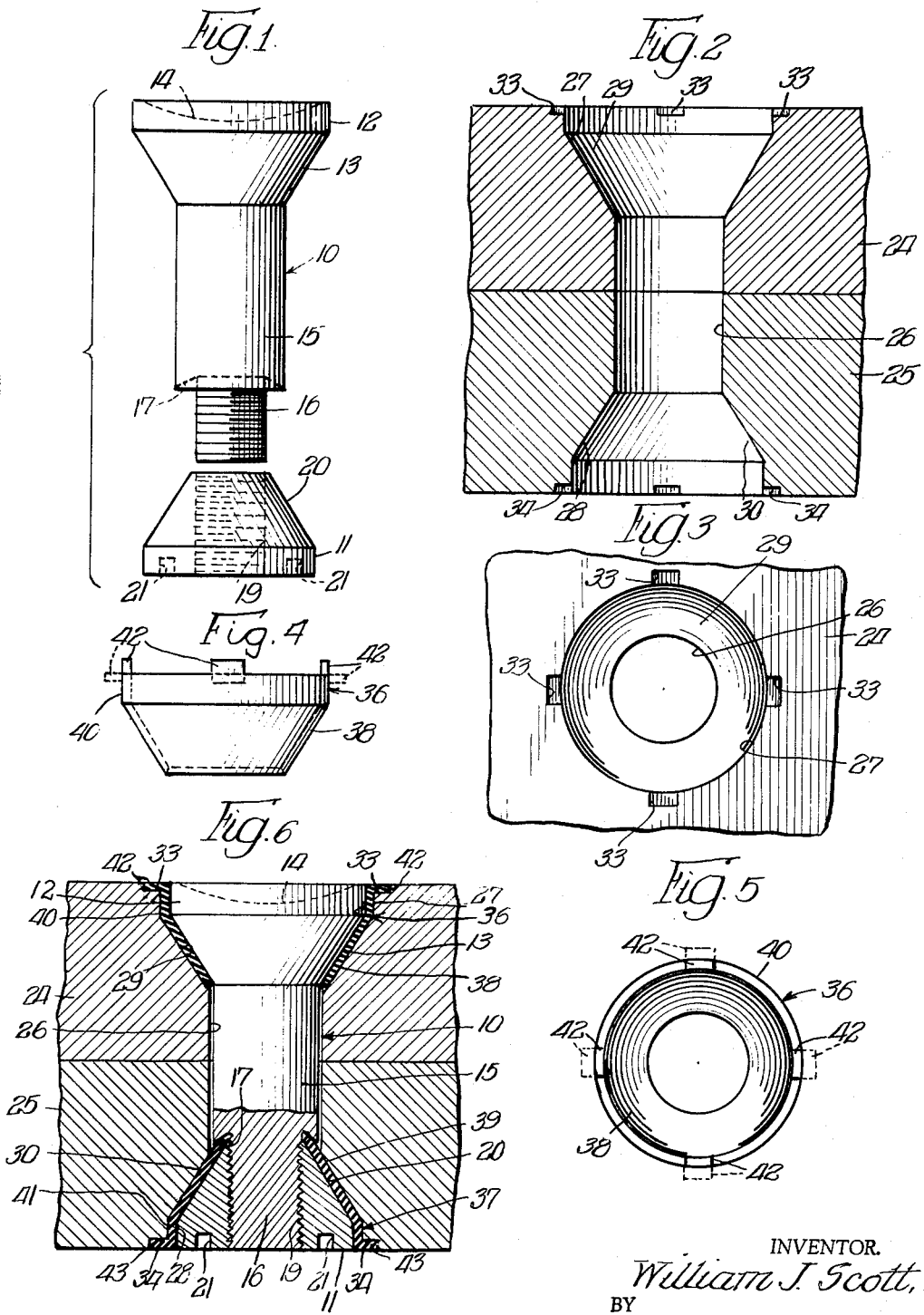

3,239,036
HIGH PRESSURE SEALING-TYPE FASTENER
William James Scott, Costa Mesa, Calif., assignor to VSI Corporation, a corporation of Illinois
Filed May 28, 1963, Ser. No. 283,726
8 Claims. (Cl. 189—36)

The present invention relates to a high pressure sealed connection and, more particularly, to a sealed fastener connection for two or more structural members.

It is an important object of the present invention to provide a new and improved high pressure sealed fastener connection including a bolt, a nut threadedly mounted thereon, and a deformable metallic sealing member associated with the nut and bolt to seal off any leakage paths through the interengaged threads thereof.

Another important object of the present invention is to provide a new and improved fastener connection for connecting two or more structural members together in a manner such that any leakage paths past the fastener are effectively sealed by deformable metallic sealing members.

A more detailed object of the present invention is to provide a new and improved high pressure sealed fastener connection including a bolt having a head, a non-threaded shank portion, and a reduced-in-diameter threaded shank end portion which terminates at its inner end a distance from the bolt head which is less than the distance therefrom to the end of the non-threaded shank portion with a generally concave conical seal-seating surface extending between the threaded and non-threaded shank portions, a nut threadedly engageable on the threaded shank end portion of the bolt and having a conical inner face complementary to the generally concave conical seal-seating surface on the bolt shank, and a thin generally conical metallic sealing member adapted to be physically deformed between the concave conical surface on the bolt shank and the conical inner face of the nut to provide a high pressure fluid-tight seal therebetween.

Another detailed object of the present invention is to provide a new and improved fastener connection of the character described for connecting two or more structural members together wherein the bolt head is provided with a conical undersurface, wherein the structural members are provided with a through bore for receiving the non-threaded shank portion of the bolt with the opposite ends of the bore being provided with recesses having conical inner end surfaces for receiving the bolt head and the nut, respectively, with the conical inner end surface of the nut recess defining an outward extension of the generally concave conical surface on the bolt shank, and wherein a pair of thin metallic sealing members generally complementary to the bolt head and nut, respectively, are removably fitted thereon and are characterized by conical portions adapted to be physically deformed between the complementary conical surfaces in the recesses and on the bolt and nut to provide high pressure sealed connections at both the bolt head and nut ends of the bore through the structural members.

Another important object of the present invention is to provide a new and improved fastener connection of the character described wherein the deformable metallic sealing members are each characterized by a conical portion disposed at an angle of approximately 37° to the longitudinal axis thereof, by an integral cylindrical portion embraceable about the periphery of the generally cylindrical bolt head and nut, and by a series of circumferentially spaced locking tabs at the outer edge of the cylindrical portion which are adapted to be seated in circumferentially spaced notches formed in the outer edges of the bolt head and nut recesses.

A still further object of the present invention is to provide a new and improved fastener connection of the character described wherein the metallic sealing members when physically deformed compensate for any minute imperfections in the complementary conical surfaces between which they are deformed.

A still further object of the present invention is to provide a new and improved high pressure sealed fastener connection of the character described wherein the sealing members are formed of thin malleable metallic materials, such as copper, aluminum, nickel and alloys thereof, whereby to provide fluid-tight sealed connections which will withstand high pressures, for instance, 40,000 p.s.i. of helium gas, with the metallic sealing members offering substantial resistance to radiation and not being affected by temperatures ranging between —420° F. and +1500° F.

Certain other objects of the invention will, in part, be obvious, and will in part appear hereinafter.

For a more complete understanding of the nature and scope of the invention reference may now be had to the accompanying drawings wherein:

FIG. 1 is an exploded side elevational view of a preferred embodiment of the bolt and nut fastener of the invention;

FIG. 2 is a central vertical section taken through a pair of structural members assembled for connection and having a through bore with end recesses formed therein to receive the bolt and nut fastener of FIG. 1;

FIG. 3 is a top plan view of the structure bore of FIG. 2;

FIG. 4 is a side elevational view of a deformable metallic sealing member of the invention;

FIG. 5 is a top plan view of the sealing member of FIG. 4; and

FIG. 6 is a central vertical section taken through the structural members of FIG. 2 after same have been sealingly connected by the bolt and nut fastener of FIG. 1 and a pair of the sealing members of FIGS. 4 and 5 whereby high pressure sealed joints are provided at both the bolt head and nut ends of the structure bore.

As illustrated in FIG. 1, a threaded fastener of the invention includes a bolt 10 and a nut 11. The bolt 10 is characterized by a generally cylindrical head 12 having a conical undersurface 13 which is preferably disposed at a angle of approximately 37° to the axis of the bolt and a driver-receiving recess 14 of known type formed in its upper surface, by a non-threaded shank portion 15 which extends downwardly from the bolt head 12, by a reduced-in-diameter externally threaded shank end portion 16 which terminates at its inner end a distance from the bolt head 12 which is less than the distance from the end of the non-threaded shank portion 15 to the bolt head 12, and by a generally concave conical surface 17 which is preferably disposed at an angle of approximately 37° to the axis of the bolt 10 and which extends between the non-threaded shank portion 15 and the reduced-in-diameter threaded shank end portion 16 whereby to define a depending skirt-like configuration.

The nut 11, which is generally cylindrical in configuration with a diameter approximately equal to that of the bolt head 12, is characterized by an internally threaded central bore 19 which is adapted for threaded engagement on the external threaded shank end portion 16 of the bolt 10, by a conical inner face 20 which is preferably disposed at an angle of approximately 37° to the axis of the nut 11 with the inner portion thereof being complementary to and adapted for mating engagement with the generally concave conical surface 17 disposed between the shank portions 15 and 16 of the bolt when the nut 11 is tightened thereon, and by a series of known type wrench-receiving recesses 21 formed in the outer face thereof.

As illustrated in FIG. 2, a pair of flat plate-like structural members 24 and 25 to be sealingly connected together have a through bore 26 formed therein with the diameter thereof being approximately equal to the diameter of the non-threaded shank portion 15 of the bolt 10. A pair of generally cylindrical recesses 27 and 28 are formed in the structural members 24 and 25, respectively, at the opposite ends of the bore 26 with the recess 27 being adapted to receive the head 12 of the bolt 10 and the recess 28 being adapted to receive the nut 11. The diameter and depth of the recess 27 are approximately equal to the corresponding dimensions of the bolt head 12 and the diameter and depth of the recess 28 are approximately equal to the corresponding dimensions of the nut 11. The inner ends of the recesses 27 and 28 are provided with conical bearing surfaces 29 and 30, respectively, which are preferably disposed at angles of approximately 37° to the axis of the bore 26, whereby the conical bearing surface 29 is generally complementary to the undersurface 13 of the bolt head 12 and the conical bearing surface 30 is generally complementary to the conical inner face 20 of the nut 11. Preferably, the bolt head 12 and the nut 11 are identical in size and shape whereby the recesses 27 and 28 will also be identical and may be readily formed by a standardized tool in a simple machining operation. For purposes that will be explained hereinafter, two series of circumferentially spaced notches 33 and 34 are formed in the outer edges of the recesses 27 and 28, respectively.

It is noted that the length of the non-threaded shank portion 15 of the bolt 10 is approximately equal to the length of the bore 26 between the recesses 27 and 28 formed at the opposite ends thereof. Thus, as is best illustrated in FIG. 6, the generally concave conical surface 17 disposed between the shank portions 15 and 16 of the bolt 10 defines an inward extension of the conical bearing surface 30 in the nut recess 28.

In order to provide high pressure sealed joints at both the bolt head and nut ends of the bore 26 extending through the structural members 24 and 25, sealing members 36 and 37 are provided on the bolt head 12 and the nut 11, respectively. As the sealing members 36 and 37 are substantially identical, only the sealing member 36 is shown in detail in FIGS. 4 and 5. Each sealing member 36 and 37 is formed of a thin malleable or deformable metallic material, such as copper, aluminum, nickel or alloys thereof, and has a configuration generally complementary to the bolt head 12 and the nut 11, respectively, so that the sealing members 36 and 37 may be readily fitted thereover and removed therefrom.

As best illustrated in FIGS. 4, 5 and 6, the sealing member 36 is characterized by a centrally bored conical portion 38 which is disposed preferably at an angle of approximately 37° to the longitudinal axis thereof and which is thereby complementary to both the conical undersurface 13 of the bolt head 12 and the conical bearing surface 29 in the bolt head recess 27, by a cylindrical portion 40 which is embraceable about the periphery of the generally cylindrical bolt head 12, and by a series of circumferentially spaced locking tabs 42 at the outer edge of the cylindrical portion 40 which normally project away from the cylindrical portion 40 in alignment therewith, as shown in full line in FIGS. 4 and 5. Likewise, as illustrated in FIG. 6, the sealing member 37 is characterized by a conical portion 39 which is preferably disposed at an angle of approximately 37° and which is therefore complementary to the conical inner face 20 of the nut 11, to the conical bearing surface 30 in the nut recess 28, and to the concave conical surface 17 on the bolt shank, by a cylindrical portion 41 which is embraceable about the periphery of the generally cylindrical nut 11, and by a series of circumferentially spaced locking tabs 43 at the outer edge of the cylindrical portion 41.

In sealingly interconnecting the structural members 24 and 25, the sealing members 36 and 37 may first be fitted over the bolt head 12 and the nut 11, respectively, after which the bolt 10 and nut 11 are loosely assembled with the bolt head 12 being received in the recess 27, the non-threaded shank portion 15 of the bolt 10 being received in the bore 26, and with the nut 11 being received in the recess 28. The sealing members 36 and 37 are then rotatably adjusted until the locking tabs 42 and 43, respectively, thereon are aligned with the notches 33 and 34, respectively. The locking tabs 42 and 43 are then bent outwardly, as shown in broken line in FIGS. 4 and 5, until same are seated in the notches 33 and 34, respectively, as illustrated in FIG. 6, whereby to prevent any rotatable shifting movement of the sealing members 36 and 37 in the recesses 27 and 28, respectively. If desired, the sealing members 36 and 37 could first be positioned in the recesses 27 and 28, respectively, and the locking tabs 42 and 43 thereon seated in their respective notches 33 and 34 prior to assembly of the bolt 10 and nut 11 to interconnect the structural members 24 and 25.

The nut 11 is then tightened on the bolt 10 whereby to rigidly and sealingly interconnect the structural members 24 and 25. As the nut 11 is tightened on the bolt 10, the conical portion 38 of the sealing member 36 is physically deformed between the conical undersurface 13 of the bolt head 12 and the complementary bearing surface 29 in the recess 27 whereby to compensate for any minute imperfections on these complementary surfaces and thus provide a high pressure fluid-tight sealed joint which prevents any leakage past the bolt head 12. Likewise, the larger diameter portion of the conical portion 39 of the sealing member 37 is physically deformed between the conical seating surface 30 in the recess 28 and the adjacent portion of the conical inner face 20 of the nut 11 to compensate for any minute imperfections on these surfaces and thus provide a high pressure fluid-tight seal which is effective to prevent any leakage around the nut 11. Similarly, the smaller diameter portion of the conical portion 39 of the sealing member 37 is physically deformed between the generally concave conical surface 17 on the bolt shank and the adjacent portion of the conical inner face 20 of the bolt 11 whereby to provide a high pressure fluid-tight sealed joint which prevents any leakage through the interengaged threads 18 and 19 of the bolt 10 and the nut 11, respectively. It is of considerable importance, obviously, that the smaller diameter end of the conical portion 39 of the sealing member 37 extend inwardly past the outer diameter of the non-threaded shank portion 15 of the bolt 10 in order to prevent any leakage through the interengaged threads of the bolt 10 and the nut 11.

In the high pressure sealed fastener connection for connecting two or more structural members together illustrated in FIG. 6, the conical portions 38 and 39 of the sealing members 36 and 37 are actually reshaped upon tightening of the nut 11 on the bolt 10 to fit the physical dimensions and any imperfections of the complementary conical surfaces between which same are deformed to compensate for any minute imperfections in these complementary conical surfaces which would otherwise result in undesirable leakage paths therethrough, whereby to prevent any leakage between the structural members 24 and 25 either past the bolt 10 and nut 11 of the connecting fastener or through the interengaged threads thereof.

It is noted that it was first discovered and then substantiated through testing that angles other than approximately 37° for the complementary conical surfaces in the bolt head and nut recesses 27 and 28, respectively, and on the bolt 10 and the nut 11 would not provide complete entrapment of the sealing members 36 and 37 therebetween. It is further noted that it has been found that, for best results, the thickness of the sealing members 36 and 37 should be between .005 of an inch and .015 of an inch depending upon the peripheral dimensions thereof.

The deformable metallic sealing members 36 and 37 of the fastener connection for sealingly interconnecting two or more structural members provide fluid-tight seals which will sustain extremely high pressures, for example, 40,000 p.s.i. of helium gas. As the sealing members 36 and 37 are formed of either copper, aluminum, nickel or alloys thereof, the sealed joints provide substantial resistance to radiation and are not affected by temperatures as low as −420° F. or temperatures as high as +1500° F. It is noted that the sealing members 36 and 37 will not creep under pressure or physical loading and thus will not permit any leakage paths to develop between the structural members 24 and 25. It is further noted that the deformable metallic sealing members 36 and 37 have the capability of work-hardening in shear to provide permanent fluid-tight seals until such time that the bolt 10 and the nut 11 are loosened or disassembled.

When the structural members 24 and 25 are separated by disassembling the bolt 10 and the nut 11, the used sealing members 36 and 37 must be removed and replaced by new non-deformed sealing members prior to reuse of the bolt 10 and the nut 11 for sealingly interconnecting a pair of structural members. This is readily accomplishable inasmuch as the sealing members 36 and 37 are removably fitted on the bolt head 12 and the nut 11.

It will be understood that certain changes may be made in the construction or arrangement of the high pressure sealed fastener connection disclosed herein without departing from the spirit and scope of the invention as defined in the appended claims.

I claim:

1. A high pressure sealed fastener connection for two or more structural members comprising, in combination, a bore extending through said structural members to be connected and having an enlarged recess at one end provided with a seal-seating surface at its inner end, a bolt characterized by a head, by a non-threaded shank portion extending through said bore, and by a reduced-in-diameter externally threaded shank end portion which terminates at its inner end inwardly of the end of said non-threaded shank portion with a generally concave seal-seating surface being provided on said bolt shank between said non-threaded and threaded portions thereof and defining an inward extension of said seal-seating surface in said recess, a nut disposed in said recess and being threadably engaged with said reduced-in-diameter threaded shank end portion of said bolt, said nut being provided with an inner face which is generally complementary to said seal-seating surface in said recess, and a thin deformable metallic sealing member seated in said recess between said inner face of said nut and said seal-seating surfaces in said recess and on said bolt shank, said sealing member being physically deformed therebetween when said nut is tightened on said bolt whereby to provide a high pressure sealed joint at the nut end of said bore.

2. A high pressure sealed fastener connection for two or more structural members comprising, in combination, a bore extending through said structural members to be connected and having an enlarged diameter recess at one end, which recess is characterized by a conical seating surface at its inner end, a bolt characterized by a head, by a non-threaded shank portion extending through said bore, and by a reduced-in-diameter externally threaded shank end portion which terminates at its inner end a distance from said head which is less than the distance from the end of said non-threaded shank portion to said head with a generally concave conical surface being disposed therebetween and defining an inward extension of said conical seating surface in said recess, a generally cylindrical nut disposed in said recess and being threadably engaged with said reduced-in-diameter threaded shank end portion of said bolt, said nut being provided with a conical inner face which is generally complementary to said conical seating surface in said recess, and a deformable metallic sealing member removably fitted on said nut and being characterized by a conical portion complementary to said conical inner face thereof and by a cylindrical portion in embracing engagement with the cylindrical portion thereof, the larger diameter portion of the conical portion of said sealing member being physically deformed between the outer portion of said conical inner face of said nut and said conical sealing surface in said recess when said nut is tightened on said bolt with the smaller diameter portion of the conical portion of said sealing member being physically deformed between the inner portion of said conical inner face of said nut and said generally concave conical surface disposed between said threaded and non-threaded shank portions of said bolt to provide a high pressure sealed joint at the nut end of said bore.

3. A high pressure sealed fastener connection for two or more structural members comprising, in combination, a bore extending through said structural members to be connected and having an enlarged diameter recess at one end, which recess is characterized by a conical seating surface at its inner end disposed at an angle of approximately 37° to the axis of said bore and by circumferentially spaced notches at its outer edge, a bolt characterized by a head, by a non-threaded shank portion extending through said bore, and by a reduced-in-diameter externally threaded shank end portion which terminates at its inner end a distance from said head which is less than the distance from the end of said non-threaded shank portion to said head with a generally concave conical surface being disposed therebetween at an angle of approximately 37° to the axis of said bolt and defining an inward extension of said conical seating surface in said recess, a generally cylindrical nut disposed in said recess and being threadably engaged with said reduced-in-diameter threaded shank end portion of said bolt, said nut being provided with a conical inner face which is complementary to said conical seating surface in said recess, and a deformable metallic sealing member removably fitted on said nut and being characterized by a conical portion disposed at an angle of approximately 37° to the axis thereof and complementary to said conical inner face of said nut, by a cylindrical portion in embracing engagement with the cylindrical portion thereof, and by a series of circumferentially spaced projecting tabs at the outer edge of said cylindrical portion thereof seated in said notches at the outer edge of said recess, the larger diameter portion of the conical portion of said sealing member being physically deformed between the outer portion of said conical inner face of said nut and said conical seating surface in said recess when said nut is tightened on said bolt with the smaller diameter portion of the conical portion of said sealing member being physically deformed between the inner portion of said conical inner face of said nut and said generally concave conical surface disposed between said threaded and non-threaded shank portions of said bolt to provide a high pressure sealed joint at the nut end at said bore.

4. A high pressure sealed fastener connection for two or more structural members comprising, in combination, a bore extending through said structural members to be connected and having at its opposite ends enlarged recesses provided with seal-seating surfaces at their inner ends, a bolt characterized by a head received in one of said recesses and having an undersurface generally complementary to said seal-seating surface in said one recess, by a non-threaded shank portion extending through said bore, and by a reduced-in-diameter externally threaded shank end portion which terminates at its inner end inwardly of the end of said non-threaded shank portion with a generally concave seal-seating surface being provided on said bolt shank between said non-threaded and threaded portions thereof and defining an inward extension of said seal-seating surface in the other recess, a nut disposed in said other recess and being threadably engaged with said reduced-in-diameter threaded shank end portion of said bolt, said nut being provided with an inner face which is generally complementary to said seal-seating surface in said other recess, a first thin deformable metallic sealing member seated in said one recess between said seal-seating surface therein and said complementary undersurface of said bolt head, and a second thin deformable metallic sealing member seated in said other recess between said inner face of said nut and said seal-seating surfaces in said other recess and on said bolt shank, said first and second sealing members being physically deformed therebetween when said nut is tightened on said bolt whereby to provide high pressure sealed joints at the bolt head and nut ends of said bore.

5. A high pressure sealed fastener connection for two or more structural members comprising, in combination, a bore extending through said structural members to be connected and having enlarged diameter recesses at its opposite ends with said recesses being characterized by conical seating surfaces at their inner ends, a bolt characterized by a generally cylindrical head received in one of said recesses and having a conical undersurface complementary to said conical seating surface in said one recess, by a non-threaded shank portion extending through said bore, and by a reduced-in-diameter externally threaded shank end portion which terminates at its inner end a distance from said head which is less than the distance from the end of said non-threaded shank portion to said head with a generally concave conical surface being disposed therebetween and defining an inward extension of said conical seating surface in the other recess, a generally cylindrical nut disposed in said other recess and being threadably engaged with said reduced-in-diameter threaded shank end portion of said bolt, said nut being provided with a conical inner face which is complementary to said conical seating surface in said other recess, a first deformable metallic sealing member removably fitted on said bolt head and being characterized by a conical portion complementary to said conical undersurface thereof and by a cylindrical portion in embracing engagement with the cylindrical portion thereof, and a second deformable metallic sealing member removably fitted on said nut and being characterized by a conical portion complementary to said conical inner face thereof and by a cylindrical portion in embracing engagement with the cylindrical portion thereof, said conical portion of said first sealing member being physically deformed between said conical undersurface of said bolt head and said conical seating surface in said one recess to provide a high pressure sealed joint at the head end of said bore when said nut is tightened on said bolt with the larger diameter portion of the conical portion of said second sealing member being physically deformed between the outer portion of said conical inner face of said nut and said conical seating surface in said other recess and with the smaller diameter portion of the conical portion of said sealing member being physically deformed between the inner portion of said conical inner face of said nut and said generally concave conical surface disposed between said threaded and non-threaded shank portions of said bolt to provide a high pressure sealed joint at the nut end of said bore.

6. A high pressure sealed fastener connection for two or more structural members comprising, in combination, a bore extending through said structural members to be connected and having enlarged diameter recesses at its opposite ends with said recesses being characterized by conical seating surfaces at their inner ends disposed at angles of approximately 37° to the axis of said bore and by circumferentially spaced notches at their outer edges, a bolt characterized by a generally cylindrical head received in one of said recesses and having a conical undersurface complementary to said conical seating surface in said one recess, by a non-threaded shank portion extending through said bore, and by a reduced-in-diameter externally threaded shank end portion which terminates at its inner end a distance from said head which is less than the distance from the end of said non-threaded shank portion to said head with a generally concave conical surface being disposed therebetween at an angle of approximately 37° to the axis of said bolt and defining an inward extension of said conical seating surface in the other recess, a generally cylindrical nut disposed in said other recess and being threadably engaged with said reduced-in-diameter threaded shank end portion of said bolt, said nut being provided with a conical inner face which is complementary to said conical seating surface in said other recess, a first deformable metallic sealing member removably fitted on said bolt head and being characterized by a conical portion disposed at an angle of approximately 37° to the axis thereof and complementary to said conical undersurface of said bolt head, by a cylindrical portion in embracing engagement with the cylindrical portion thereof, and by a series of circumferentially spaced projecting tabs at the outer edge of said cylindrical portion thereof seated in said notches at the outer edge of said one recess, and a second deformable metallic sealing member removably fitted on said nut and being characterized by a conical portion disposed at an angle of approximately 37° to the axis thereof and complementary to said conical inner face of said nut, by a cylindrical portion in embracing engagement with the cylindrical portion thereof, and by a series of circumferentially spaced projecting tabs at the outer edge of said cylindrical portion thereof seated in said notches at the outer edge of said other recess, said conical portion of said first sealing member being physically deformed between said conical undersurface of said bolt head and said conical seating surface in said one recess to provide a high pressure sealed joint at the head end of said bore when said nut is tightened on said bolt with the larger diameter portion of the conical portion of said second sealing member being physically deformed between the outer portion of said conical inner face of said nut and said conical seating surface in said other recess and with the smaller diameter portion of the conical portion of said sealing member being physically deformed between the inner portion of said conical inner face of said nut and said generally concave conical surface disposed between said threaded and non-threaded shank portions of said bolt to provide a high pressure sealed joint at the nut end of said bore.

7. A nut and bolt sealing-type fastener comprising, a bolt characterized by a head, by an adjacent non-threaded shank portion, and by a reduced-in-diameter externally threaded shank end portion, said reduced-in-diameter externally threaded shank end portion terminating at its inner end at a point spaced from the bolt head a lesser distance than that between the end of said non-threaded shank portion and said bolt head, a generally concave conical surface extending between said non-threaded and threaded shank portions, a nut threadedly engageable with said reduced-in-diameter externally threaded shank end portion and having a conical inner face generally complementary to said generally concave conical surface on said bolt shank, and a conical deformable metallic sealing member generally complementary to said conical inner face of said nut and adapted to be physically deformed between said conical inner face of said nut and said generally concave conical surface on said bolt shank whereby to compensate for any imperfections on said complementary surfaces and thus provide a high pressure seal which is effective to prevent any leakage between the interengaged threads of said bolt and nut.

8. A nut and bolt sealing-type fastener comprising, a bolt characterized by a head having a conical undersurface, by an intermediate non-threaded shank portion, and by a reduced-in-diameter externally threaded shank end portion, said reduced-in-diameter externally threaded shank end portion terminating at its inner end at a point spaced from the bolt head a lesser distance than that between the end of said non-threaded shank portion and said bolt head, a generally concave conical surface extending between said non-threaded and threaded shank portions, a nut threadedly engageable with said reduced-in-diameter externally threaded shank end portion and having a conical inner face generally complementary to said generally concave conical surface on said bolt shank, a first conical deformable metallic sealing member generally complementary to said conical undersurface of said bolt head and adapted to be physically deformed between said bolt head undersurface and a complementary conical seating surface at the inner end of a structure recess for said bolt head, whereby to compensate for any imperfections on said complementary surfaces and thus provide a high pressure seal at the head end of said bolt, and a second conical deformable metallic sealing member generally complementary to said conical inner face of said nut and adapted to be physically deformed between said conical inner face of said nut and both said generally concave conical surface on said bolt shank and a complementary conical seating surface at the inner end of a structure recess for said nut, which recess surface is aligned generally with said concave conical surface on said bolt shank, whereby to compensate for any imperfections on said complementary surfaces and thus provide a high pressure seal at the nut end of said bolt.

References Cited by the Examiner
UNITED STATES PATENTS

| | | | |
|---|---|---|---|
| 375,350 | 12/1887 | Glover | 85—4 |
| 1,690,183 | 11/1928 | Stoughton | 85—1 |

HARRISON R. MOSELEY, *Primary Examiner.*

A. I. BREIER, *Assistant Examiner.*